US012640585B2

(12) United States Patent　　　　(10) Patent No.: US 12,640,585 B2

Hittle　　　　　　　　　　　　　　　(45) Date of Patent: May 26, 2026

(54) SOFTWARE-DEFINED ELECTRICAL POWER MANAGEMENT AND DISTRIBUTION CONTROLLER FOR REMOTE SYSTEMS

(71) Applicant: Amplified Design Solutions, LLC, Longmont, CO (US)

(72) Inventor: Jerome D Hittle, Longmont, CO (US)

(73) Assignee: Amplified Design Solutions, LLC, Longmont, CO (US)

( * ) Notice: Subject to any disclaimer, the term of this patent is extended or adjusted under 35 U.S.C. 154(b) by 480 days.

(21) Appl. No.: 17/847,994

(22) Filed: Jun. 23, 2022

(65) Prior Publication Data

US 2022/0416572 A1　　Dec. 29, 2022

Related U.S. Application Data

(60) Provisional application No. 63/214,168, filed on Jun. 23, 2021.

(51) Int. Cl.
| | |
|---|---|
| *H02J 13/00* | (2026.01) |
| *G05B 19/042* | (2006.01) |
| *H02J 7/35* | (2006.01) |

(52) U.S. Cl.
CPC ...... *H02J 13/00022* (2020.01); *G05B 19/042* (2013.01); *H02J 7/35* (2013.01); *G05B 2219/2639* (2013.01); *H02J 2300/26* (2020.01)

(58) Field of Classification Search
CPC ............. H02J 13/00022; G05B 19/042; G05B 2219/2639
See application file for complete search history.

(56) References Cited

U.S. PATENT DOCUMENTS

| | | | | |
|---|---|---|---|---|
| 4,517,618 | A | * 5/1985 | Frank | H02H 11/005 |
| | | | | 361/58 |
| 5,793,813 | A | * 8/1998 | Cleave | H04B 7/18567 |
| | | | | 375/259 |
| 6,262,558 | B1 | * 7/2001 | Weinberg | B64G 1/443 |
| | | | | 320/101 |
| 6,664,656 | B2 | 12/2003 | Bernier | |
| 7,936,084 | B2 | 5/2011 | Serventi | |
| 9,236,744 | B2 | 1/2016 | Shipley | |
| 10,065,583 | B2 | 9/2018 | Carleial | |
| 10,103,549 | B2 | * 10/2018 | Rozman | B64G 1/428 |
| 11,018,521 | B2 | 5/2021 | Freitag | |
| 11,135,923 | B2 | 10/2021 | Slepchenkov | |
| 2011/0037427 | A1 | * 2/2011 | Boncyk | B64G 1/425 |
| | | | | 320/107 |
| 2011/0073714 | A1 | * 3/2011 | Hruby | B64G 1/405 |
| | | | | 244/171.1 |
| 2012/0262133 | A1 | * 10/2012 | Martinelli | H02J 1/06 |
| | | | | 323/234 |

(Continued)

*Primary Examiner* — Mohammad Ali
*Assistant Examiner* — Vincent W Chang
(74) *Attorney, Agent, or Firm* — Samuel M. Freund; Cochran Freund & Young LLC

(57) ABSTRACT

A software-defined power management and distribution system for spacecraft and other remote systems, which maximizes adjustability of the electrical power systems thereof using software, and without having to change the associated hardware is described. Embodiments of the present apparatus are remotely adjustable, thereby enabling more rapid configuration of spacecrafts during construction as well as reconfiguration thereof while in orbit.

26 Claims, 8 Drawing Sheets

(56)  References Cited

U.S. PATENT DOCUMENTS

| | | | |
|---|---|---|---|
| 2014/0176076 A1* | 6/2014 | Momo | H01M 10/0583 |
| | | | 320/128 |
| 2017/0305579 A1* | 10/2017 | Lu | B64G 1/428 |
| 2018/0116070 A1 | 4/2018 | Broadbent | |
| 2018/0244407 A1* | 8/2018 | Rozman | H02J 1/08 |
| 2020/0042062 A1 | 2/2020 | Astefanous | |

* cited by examiner

SOFTWARE-DEFINED ELECTRICAL POWER MANAGEMENT AND DISTRIBUTION CONTROLLER FOR REMOTE SYSTEMS

CROSS-REFERENCE TO RELATED APPLICATIONS

The present application claims the benefit of U.S. Provisional Patent Application No. 63/214,168 for "Software-Defined Electrical Power Management and Distribution Controller for Remote Systems" by Jerome D. Hittle, which was filed on Jun. 23, 2021, the entire content of which application is hereby specifically incorporated by reference herein for all that it discloses and teaches.

BACKGROUND

Digital control systems and digital control of power supplies are well known and analyzed, as is the Zeta converter power supply. Field Programmable Gate Array (FPGA) technology is commonly used in aerospace for digital control of systems.

Traditionally the design of Power Management And Distribution (PMAD) systems for Electrical Power Systems (EPS) for spacecraft require significant foresight into the entire spacecraft operation. A predetermined battery voltage range, solar array voltage and current range, and load voltages are well understood months, if not years, prior to the actual implementation of the spacecraft. The design cycles are long and often suffer from scope creep, and changes late in the design phase can have detrimental effect on costs and implementation of the PMAD for each spacecraft. Even when power supplies are well understood and no changes occur during the design cycle, payloads often change between missions, and many have different voltage requirements, or have specially designed power supplies onboard to conform with the power supply of the primary power system.

SUMMARY

In accordance with the purposes of the present invention, as embodied and broadly described herein, an embodiment of the software-defined electric power management and distribution system, hereof, includes: a command and data handling computer; a receiver for receiving RF commands and for directing commands to the command and data handling computer; a DC voltage source; an input electric power regulator for maximum power point tracking, electrically connected with the DC voltage source, and for regulating the voltage therefrom, thereby generating a first voltage; an electric power controller for receiving commands from the command and data handling computer, and for controlling the input electric power regulator; and an output electric power regulator for receiving the first voltage, and for receiving commands from the electric power controller, for generating a second voltage responsive to the commands from the power controller.

In another aspect of the present invention and in accordance with its purposes, as embodied and broadly described herein, an embodiment of the method for electric power management and distribution using software, hereof, includes: providing a command and data handling computer; receiving RF commands and directing the commands to the command and data handling computer; providing a DC voltage source; providing an electric power controller for receiving commands from the command and data handling computer; generating a first voltage from the DC voltage source responsive to commands from the electric power controller; regulating the first voltage responsive to commands from the electric power controller, thereby implementing maximum power point tracking; generating a second voltage from the first voltage responsive to commands from the electric power controller; and regulating the second voltage responsive to commands from the electric power controller.

In yet another aspect of the present invention and in accordance with its purposes, as embodied and broadly described herein, an embodiment of the software-defined electric power management and distribution system, hereof, includes: a command and data handling computer; a receiver for receiving RF commands and for directing commands to the command and data handling computer; a DC voltage source; an input electric power regulator for direct energy transfer, electrically connected with the DC voltage source, and for regulating the voltage therefrom, thereby generating a first voltage; an electric power controller for receiving commands from the command and data handling computer, and for controlling the input electric power regulator; and an output electric power regulator for receiving the first voltage, and for receiving commands from the electric power controller, for generating a second voltage responsive to the commands from the power controller.

In still another aspect of the present invention and in accordance with its purposes, as embodied and broadly described herein, an embodiment of the method for electric power management and distribution using software, hereof, includes: providing a command and data handling computer; receiving RF commands and directing the commands to the command and data handling computer; providing a DC voltage source; providing an electric power controller for receiving commands from the command and data handling computer; generating a first voltage from the DC voltage source responsive to commands from the electric power controller; regulating the first voltage responsive to commands from the electric power controller, thereby implementing direct energy transfer; generating a second voltage from the first voltage responsive to commands from the electric power controller; and regulating the second voltage responsive to commands from the electric power controller.

Embodiments of the present invention include a software-defined Power Management And Distribution (PMAD) system for spacecraft, and other remote applications, also described as a Software Defined Power Controller (SDPC). The SDPC maximizes adjustability of the spacecraft electric power systems using software, and without having to change the associated hardware. The use of power supply topologies that both step-up and step-down the input voltage provide operation over a wider input and output voltage range than conventional PMADs.

Embodiments of the SDPC interface a solar array, a battery, and multiple loads (antennas, scientific instruments, etc.) to provide power delivery and regulation to the entire spacecraft. Due to the wide operating voltages, the SDPC can then be interfaced with a wide assortment of battery and solar array configurations, as well as loads requiring different voltages. Interfacing with a wide assortment of solar arrays, batteries, and load devices allows the user to quickly interface spacecraft components to create an entire Electrical Power System (EPS) for a spacecraft, thereby significantly reducing system level design time.

Embodiments of the SDPC are adjustable while in orbit. Current limits, voltage regulation, rise times, and peak power operation can be determined on each of the solar arrays, batteries, and loads to provide optimal results as viewed by flight control based on the ground.

Benefits and advantages of embodiments of the present invention include, but are not limited to, providing a software defined power controller for spacecraft electrical power systems enabling adjustability at altitude in orbit, and rapid configuration of spacecraft in preparation for flight, dependent on the current availability of energy sources (solar arrays), energy storage (batteries), and payloads in the supply chain.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
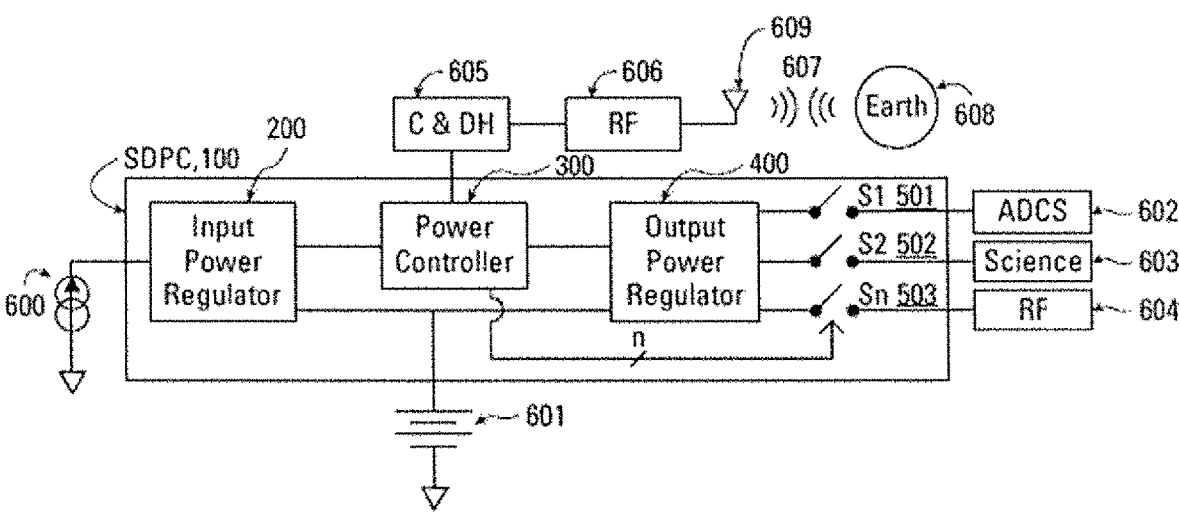
FIG. 1 is a schematic representation of an embodiment of the present software-defined power controller.

Briefly, embodiments of the present invention include a Software-Defined Power Controller (SDPC) for remote systems, also known as a software-defined Power Management And Distribution (PMAD) system, which maximizes adjustability of a spacecraft or other remote device, electrical power systems using software, and without having to change the associated hardware. The term remote includes satellites, spacecraft, underwater systems, robotic systems, internet-of-things, industrial internet-of-things, and other remote applications where configurable PMAD systems can be used. Embodiments of the SDPC may include an input power regulator, an output power regulator, and a centralized power controller. The SDPC interfaces with a DC electrical energy source, a DC electrical energy storage device, various spacecraft loads, such as an RF transmitter/receiver, Attitude Determination and Control System (ADCS), scientific instruments, etc., and an external command unit, typically a flight Command and Data Handling (C&DH) computer, or a user interface (UI). The input power regulator converts power from the DC electrical energy source to DC power that charges an energy storage device and is controlled by a power controller. The output power regulator converts power from the DC energy storage device to an $n^{th}$ plurality of spacecraft loads using electronic switches, and is also controlled using the centralized power controller. At a high level, the power controller controls all aspects of each of the power supplies, and interfaces with the C&DH computer to receive ground commands, and to provide telemetry to earth-based systems by radiofrequency (RF) communication. It is noted that while RF communication is described herein, other wireless communication technologies can also be used, such as laser and ultrasonic communications.

Typically, PMAD power supplies are used to step-up (boost) or step-down (buck) the input voltage. For the case of a stepped-down power supply, the input voltage must be higher than the output voltage. As an example, a power supply outputting 5V to a load must have an input voltage of 6V or more. A switch mode power supply then turns on and off a switch at a specific duty cycle and/or frequency to regulate the power supply output voltage to 5V. A minimum voltage above the output voltage is generally required of the input voltage for the power supply to operate properly; this is known as the 'dropout voltage', in this case 1V ($V_{input,min} = 5V_{out} + 1V_{dropout} = 6V$). Requiring the input voltage of the power supply to be above 6V limits the number of batteries and types of batteries that can be used on the spacecraft, for the solar array controller. It also limits the number of solar arrays and solar array configurations that can be used.

In addition to the dropout difficulties in traditional PMAD's, the output voltages of the power supplies are often limited in adjustability. Most power supplies are analog in nature, using analog saw-tooth or triangle waveforms, capacitors, resistors, op-amp integrators, etc. for sensing the voltage and current of the power supply, thereby creating an error signal, and producing a signal for driving the power supply switches at a desired duty cycle as to output the desired output voltage and/or current. Typical power supplies are also hardware based, with little or no software interfaces to be able to manipulate the power supply operation. The reliance on such systems is costly in mass and volume due to the number of power supplies required to implement a complete system. Embodiments of the present SPDC use digital control techniques to adjust the current and voltage of the power supply. As such, the analog saw-tooth or triangle waveform is replaced with a digital up or up-down counter, the current is sensed with a comparator and brought into FPGA fabric to limit the duty cycle, and the voltage control loop is regulated within FPGA fabric or within a microcontroller, depending on the use of each individual power supply. Digital implementation of such control loops within the SDPC provides significant flexibility for the system.

An objective of the SDPC is to be configurable to solve these issues, interfacing with a wide range of solar arrays, batteries, and loads and significantly reducing the time from concept to implementation of a total spacecraft system.

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning now to FIG. 1 a schematic representation of an embodiment of Software-Defined Power Controller (SDPC), 100, is illustrated. It includes an Input Electrical Power Regulator, 200, an Output Electrical Power Regulator, 400, and a centralized Power Controller, 300. SDPC 100 interfaces with DC electrical energy source, 600, (depicted as a solar array), a DC electrical energy storage device 601

(depicted as a battery), various spacecraft loads, 602, through, 604, (such as an RF transmitter/receiver, attitude determination and control system (ADCS), scientific instrument, etc.), and an external command unit, 605, (typically a flight Command and Data Handling (C&DH) computer, 605, or a user interface (UI)). The 'n' is shown to illustrate that there can be other switch control signals. Input power regulator 200 converts power from DC electrical energy source 600 to the DC electrical energy storage device 601 and is controlled by power controller 300. Output power regulator 400 converts power from DC electrical energy storage device 601 to an $n^{th}$ plurality of spacecraft loads 602 through 604 using electronic switches 501 through 503 and is also controlled using centralized power controller 300. At a high level, power controller 300 controls all aspects of each of the power supplies 200 and 400 and interfaces with C&DH computer 605 to receive ground commands and provide telemetry to earth-based systems, 608, through RF communication, 606, 607, and, 609. It is to be noted that elements 606 and 604 are part of the same RF subsystem, element 604 providing power element 606 for enabling communication with earth-bound systems.

It will be apparent to those having skill in the art, that input power regulator 200 and output power regulator 400 can be either a singularity or plurality of each device based on requirements for each spacecraft. To achieve significant flexibility of the system, both regulators step-up (boost) and step-down (buck) the input voltage to a regulated output voltage. Typical topologies for such regulators enabling maximum power point tracking, include buck-or-boost, Cuk, Zeta, Single-Ended, Primary-Inductor Converter (SEPIC), isolated Cuk, isolated flyback, and other topologies conducive to efficient power conversion. Further, regulator 200 may use direct energy transfer techniques such as sequential shunt switching regulation (S3R), sequential series-shunt switching regulation (S4R), and the like, which are commonly used in spacecraft charge control systems, instead of a switching regulator for producing efficient power conversion from the solar array to the spacecraft power bus. While the invention is not limited to these topologies, an advantageous form of the SDPC uses a SEPIC converter for input power regulator 200 and a Zeta converter for output power regulator 300. The selection of these converters is based on the ability to have wide input and output voltage requirements, while also boosting, bucking, and inverting the output voltages, without the added expense of fully galvanic isolation, and the inherent low-noise on the external interfaces for each converter. Coupling capacitors are also used in each of these converters to provide intermediary isolation in the sense that turning on either transistor switch of the converter does not directly connect the input power supply to the output. That is, both transistors need to be switched on-and-off in rapid succession to output power to the loads.

For each input power regulator 200 and output power regulator 400, control registers are used to provide adjustability to meet individual spacecraft and regulator requirements. For each input power regulator 200 the nominal battery charge current, maximum voltage output, nominal input current and voltage, operating frequency, maximum and minimum switch duty cycles, and control parameters can be modified to achieve peak efficiency of the system. Similarly, for each output power regulator 400 the nominal voltage output, maximum current output, operating frequency, maximum and minimum switch duty cycles, and control parameters can also be modified to achieve peak efficiency of the system. Control registers comprise memory that may be accessed by a microcontroller or a Field-Programmable Gate Array (FPGA) for controlling the operational states of the power regulator. Control registers may exist within the accessible memory space of firmware, FPGA fabric, random access memory (RAM), or other physical memory locations of the system. An FPGA is an integrated circuit consisting of an array of programmable logic cells, configured after manufacture using software commonly known as Hardware Description Language (HDL), which configures the peripherals within the FPGA to perform a useful task. That is, the FPGA does not run software in the same manner that a microcontroller would run software; rather, the software written for an FPGA describes the way in which the hardware within the FPGA operates. The basic architecture of an FPGA (or fabric) consists of a several elements, such as combinational and sequential logic, interconnects and Input/Output Blocks. Examples of control registers for the input and output regulators include desired voltage output, the output current limit, the input current limit, the overvoltage trip, the startup ramp rate, fault management options, etc. To change the registers, commands are sent through C&DH interface 605, or a C&DH emulator using a serial interface, often I²C or CAN, which are serial communication protocols used to communicate between devices in a system, in the present case, communication between the C&DH emulator and the SDPC.

Figure 2:
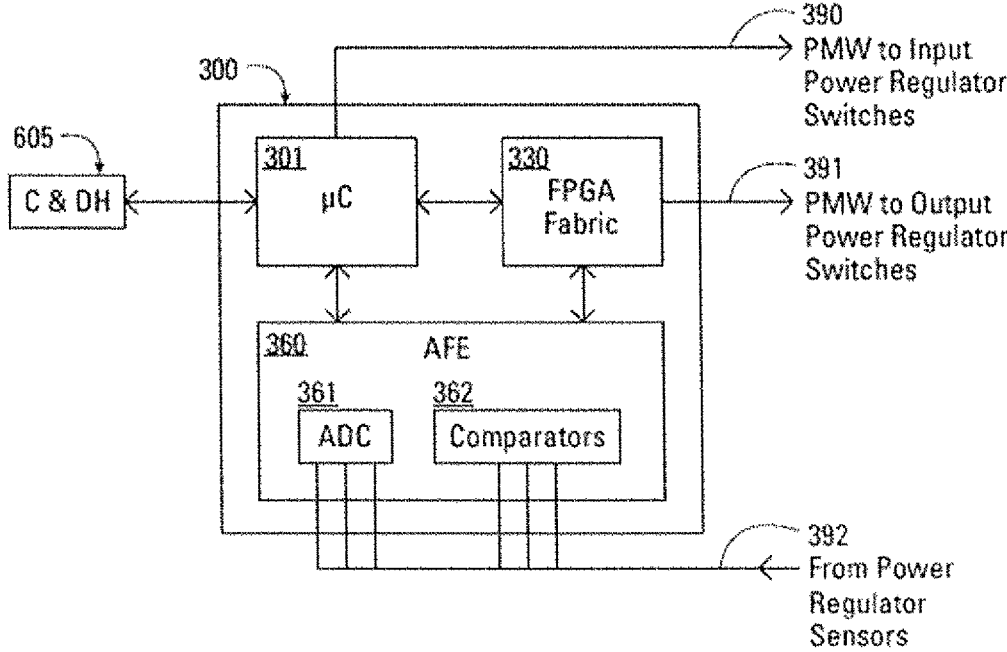
FIG. 2 is a schematic representation of the power controller shown in greater detail than illustrated in FIG. 1.

FIG. 2 is a schematic representation of power controller 300 shown in greater detail than illustrated in FIG. 1. As an example, the power controller 300 is a single integrated circuit with microcontroller 301, FPGA fabric 330, and Analog Front End (AFE) 360, known in industry as a System-on-Chip (SoC). The Microchip Smart Fusion SoC is an example of one such integrated circuit. FPGA fabric 330 is utilized to provide feedback control of output power regulator(s) 400 to support high-speed control systems with open-loop bandwidths of approximately 1 kHz, or greater. FPGA fabric 330 controls the regulator by receiving inputs from power regulator sensors 392 and outputting a Pulse-Width Modulated (PWM) output signals to output power regulator power switches 391. Similarly, the microcontroller 301 within power controller 300 is utilized to provide feedback control of the input power regulator(s) 200, supporting the slower control systems with open-loop bandwidths below 1 kHz. Microcontroller, 301, controls the regulator by receiving input from power regulator sensors, 392, and outputting PWM output signals to input power regulator power switches, 390. The analog front end (AFE) converts analog signals to digital signals using analog-to-digital converter, 361, (ADC), or a multiplicity thereof, for time-sampled signals, or comparator 362, or a multiplicity thereof, for threshold limited signals. The analog signals are received from power regulator sensors 392, which measure voltages, currents, temperatures, time delays, and frequencies, etc. within Input and output power regulators, 200 and 400. It will be apparent to those having skill in the art, that all of these components need not be located on a single SoC, but each part can be broken up into individual subsections and place discretely onto an SDPC using a variety of integrated circuits.

Figure 3:
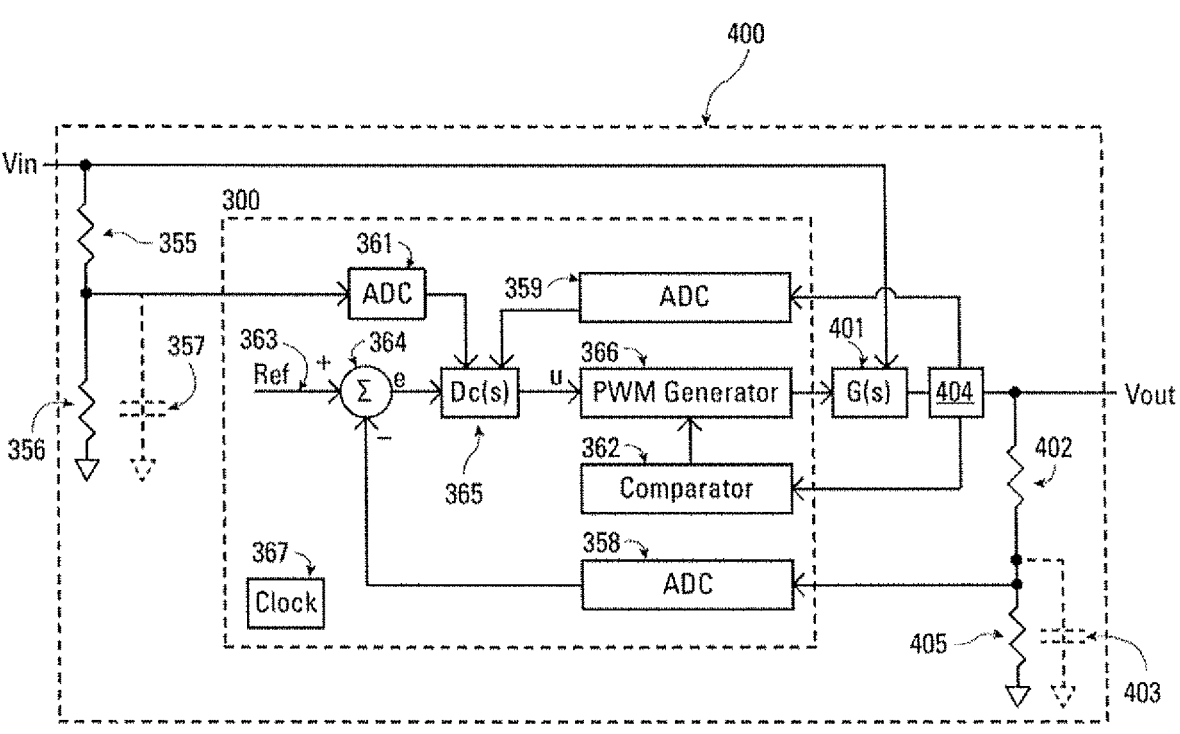
FIG. 3 is a schematic representation of an embodiment of the output regulator.

Within power controller 300 several control loops control Input and Output Regulators 200 and 400. One example of output regulator 400 is depicted in FIG. 3. Power controller 300 hosts several ADC channels, for example, 358, 359, and 361. ADC 358 measures output voltage, $V_{out}$, through voltage resistor divider, 402, and, 405, optionally being filtered using capacitor, 403, while ADC 361 measures the input voltage through voltage resistor divider, 355, and, 356, optionally filtered using capacitor, 357. The sensed output voltage is input into ADC channel 358 and converted to a digital value between 0 and $2^n-1$, where n is the number of digital bits of the ADC, between 0 and 4095 for a 12 bit ADC. This output ADC measurement is compared, 364, to a reference value, 363, that is assigned within a register in power controller 300. As stated above, a register is a memory location, and the contents of a specific memory location contains the reference value to be compared with the ADC value, by subtracting the ADC value from the reference value 363 and directed to digital controller, 365. That is, 364 is the summation of the reference value minus the ADC value. This compared value 364 becomes the error signal between the actual output voltage and the nominal reference value. Elements 363, 364, 365, and 366 all may be implemented in either microcontroller 301, FPGA fabric 330, or in a combination thereof. When the output is properly regulated, the difference between the ADC value and the reference is zero, setting $V_{out}$ to the desired voltage. A comparator is used to turn off the PWM signal if current comparator 362 is tripped. The error signal enters digital controller, 365, (Dc(s)) where algorithms calculate a control signal that is sent to PWM generator, 366, and an output PWM signal is directed to the plant (G(s)) to control the switching transistors of the power supply.

As mentioned, reference 363 sets the desired output voltage based on the resistor/divider, and is compared to the ADC value to create an error signal 'e', shown in FIG. 3, digital controller 365 ($D_c$(s)) processing the data based on Equations 1 and 2, below, and generates a control signal 'u', also shown in FIG. 3. PWM generator 366 generates a pulse-width modulated signal based on the magnitude of 'u', having a duty cycle between 0 and 100%. Input voltage, $V_{in}$, can be sampled through voltage resistor divider, 355, and, 356, optionally filtered using capacitor, 357, using ADC 361, and the current measured using current sensor, 404, and ADC 359 to adjust the performance of digital controller 365. It is noted that $V_{in}$ and $V_{out}$ correspond to 601, and 602, 603, and 604 in FIG. 1, respectively. However, it will be apparent to those having skill in the art, that control of input power regulator 200 is identical, with $V_{in}$ and $V_{out}$ corresponding to electric energy source 600 and electric energy storage device 601, respectively. Current sensor 404 converts current to a linearly-scaled voltage, and measures the current flow from G(s), 401.

A second control loop is used within the power supply to regulate the maximum current through the switches, inductors, and or output current within output regulator 400. Current sensor 404 measures the current and analog comparator 362 senses when the current exceeds a maximum threshold and PWM signal 366 is halted immediately. This inner current control loop is considered to be an analog control loop, as it has much higher bandwidths than the slower voltage control loop, upwards of approximately 1 MHz or greater. The ability to have this analog control loop is important since new GaN transistors quickly fail if maximum currents are exceeded, and must be switched off as quickly as possible in such situations. Comparator 362 thresholds can be adjusted in software to meet individual power supply requirements, with a maximum level that keeps the transistors operating at safe levels.

As stated, $V_{in}$ is sensed using ADC 361, $V_{out}$ is sensed using ADC 358, and output current 404 is sensed using ADC 359. These measured values can each be used to adjust the gain factors $K_a$, $K_b$, and $K_c$, described below, of digital controller 365 to optimize performance of the output converter 400. Clock, 367, synchronizes all the various components within power controller 300. It is attached to all of the components within the power controller, but does not directly affect the control system, which is a discrete system.

Both input and output power regulators 200 and 400 are controlled using a digitally adjustable, lead-lag controller, or proportional, integral, derivative (PID) controller within FPGA fabric 330, or microcontroller 301. A digital lead-lag controller is implemented using Equation 1, below. A PD controller is implemented using Equation 2, below. Each controller can use a singular or several values of each equation to properly compensate each regulator. Such a controller is implemented within digital controller ($D_c$(s)) 365 for using input error signal 364, to determine an output control signal for PWM generator 366.

$$u(k)=e(k)+K_a e(k-1)-K_b u(k-1) \tag{Eqn 1}$$

$$u(k)=u(k-1)+K_a e(k)-K_b e(k-1)+K_c e(k-2), \tag{Eqn 2}$$

where u(k) is the output, u(k−1) is the previous output value, e(k) is the current discrete error signal, e(k−1) is the previous discrete error signal, e(k−2) is the discrete error signal previous to e(k−1), and $K_a$, $K_B$, and $K_C$ are all gain factors stored within register memory. The gain factors can be adjusted in real-time by the C&DH or by the SDPC based on the input voltage, output current, power supply temperatures, etc. to keep the controller stable and maximize the open-loop bandwidth. As these Equations 1 and 2 are implemented within software of the microcontroller or software that defines the configuration of the FPGA fabric, they can also be replaced with more advanced control techniques, such as robust, stochastic, machine learning, neural net, artificial intelligence, state-space, and fuzzy logic control techniques. Additionally, control techniques that have not described herein can also be implemented, assuming they are able to be realized within the microcontroller or FPGA fabric.

Figure 4:
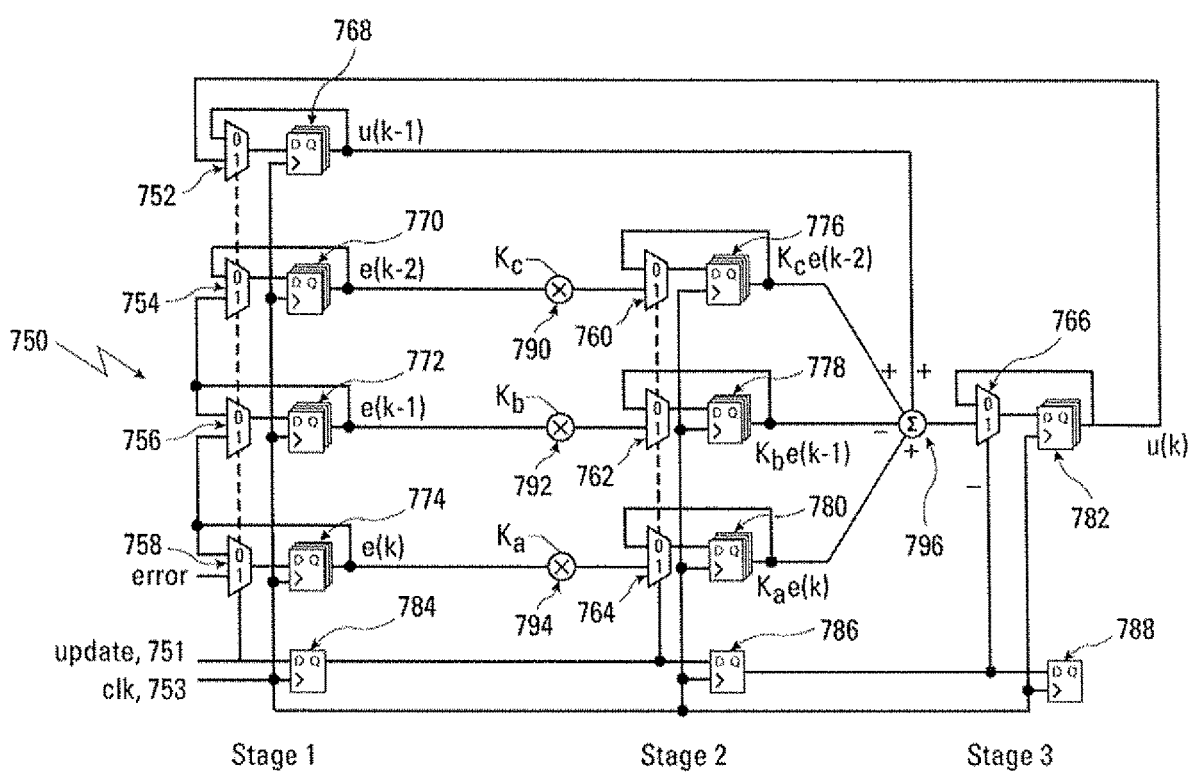
FIG. 4 illustrates calculations implemented by the digital controller using Equation 2 within the FPGA fabric.

FIG. 4 illustrates an example, 750, of the implementation of Equation 2 within the FPGA fabric. Multiplexers, 752, 754, 756, 758, 760, 762, 764, and 766, direct data into the data input 'D' of plurality of d-flip-flops, 768, 770, 772, 774, 776, 778, 780, and 782. The data output 'Q' from d-flip-flops 770, 772, and 774 are multiplied by $K_c$, $K_b$, and $K_a$, respectively, by multipliers 790, 792, and, 794, respectively, with the outputs thereof being directed to multiplexers 760, 762, and 764, respectively. The first stage stores inputs to the equation, the second stage multiplies each input with its gain factor, and the third stage provides the summation using adder, 796, for obtaining u(k) in Equation 2. An update signal, 751, on a delay line is used to synchronize all the events; additional delay flip-flops can be added or removed as required, to meet timing requirements. A high frequency clock, 753, synchronizes all of the flip-flops in the circuit. The symbol '>' in the components identifies the input from clock 753. Single, d-flip-flops, 784, 786, and, 788, direct update signal 751 to multiplexers, 766, 764, 762, and 760. $K_a$, $K_b$, and $K_c$, can all be adjusted in real-time either through the C&DH interface or through automated methods. It will be apparent to those having skill in the art that a similar circuit can be designed within the FPGA fabric to realize Equation 1. Not illustrated is the generation of the error signal which is the difference between $V_{out}$ and REF.

The operation of the circuit in FIG. 4 will now be described. As will be apparent to those having skill in the art of FPGA design, a D flip-flop, in its most basic form, stores a logic '0' or '1' on the output 'Q' pin, each time a rising edge of a clock is received on the clock '>' pin. The value stored at the 'Q' output is dependent on logic value present on the 'D' input pin at the time of the rising edge of the clock '>' signal. In this way, each D flip-flop stores a single bit of data. As an example, assume a '1' is applied to the 'D' input of element 784 for a single clock cycle, returning to logic low '0' for all successive clock cycles. At the rising edge of the clock signal, the 'Q' output of element 784, goes to '1' and returns to '0' on the second rising edge of the clock. Assume further, that after the first clock rising edge, a '1' is placed not only on the 'Q' output of element 784, but also on the 'D' input of element 786, and on the second clock cycle a '1' is placed on the 'Q' output of element 786, returning to '0' on the third clock cycle. Similarly, a '1' is placed on the 'Q' output of element 788 on the third clock cycle, and returning to '0' on the fourth clock cycle. In this way, a logic '1' at the update input 751 propagates from D flip-flop 784 to 786 and finally to 788 at each successive clock rising edge, and synchronizes the remainder of the circuit, as described in the following paragraphs.

Similar to the single D flip-flop circuit described above, the plurality of D flip-flops 768, 770, 772, 774, 776, 778, 780, and 782, all store data on their 'Q' output. The use of multiplexers 752, 754, 756, 758, 760, 762, 764, and 766, allow the data to be stored for multiple clock cycles, as the 'Q' output only changes when the multiplexer input is '1' as indicated by the update synchronization path derived from update input 751. As an example, when multiplexer 758 has '0' input the output of D flip-flop 774 remains constant until both the update 751 and the clock 753 signals have a '1'. In this way, multiple multiplexers and D flip-flop pairs are used to temporarily store data to make the necessary calculations for the equation.

In the first stage, after each ADC sample 385, the digital representation of the error signal 364 is placed on the input of multiplexer 758, and the update input 751 is pulsed, storing the error signal on the D flip-flop 774 'Q' output pin, representing e(k). In this manner, each successive occurrence of the ADC 385 sample and update pulse 751 being received propagates the error input to each of the e(k), e(k−1), and e(k−2) 'Q' outputs, on D flip-flops 774, 772, and 770, respectively. This is commonly referred to 'pipelining' data thru the FPGA. The same technique is used to temporarily store the output data u(k) at the 'Q' output of D flip-flop 768 as u(k−1).

The second stage, also called the multiplication stage, multiplies gain factors $K_a$, $K_b$, and $K_c$, with e(k), e(k−1), and e(k−2), respectively, using multipliers 794, 792, and 790. The results of the multiplication are stored in D flip-flops, 780, 778, and 776 when the input of D flip-flop 786 is '1' and a rising clock pulse 753 is received. It is noted that multiplication is a time extensive task, and multiple D flip-flops can be placed between 784 and 786 to provide adequate time for the multiplication to be completed before sending the results of the multiplication to adder, 796.

The third stage, also called the summation stage, adds the results of $K_a$e(k), −$K_b$e(k−1), $K_c$e(k−2), and u(k−1) together using adder 796. The result of the addition is then stored in D flip-flops 782 when the input of D flip-flop 788 is '1' and a rising clock pulse is received. It is noted that addition of large numbers is often a time extensive task, and multiple D flip-flops can be placed between 786 and 788 to provide adequate time for the addition to be completed before sending the results of the multiplication to pulse width modulator 366. This process has been directed to controlling the output voltage; however, it is noted that any measurement acquired by an ADC can be controlled in a similar manner, including the input voltage, input current, output voltage, output current, regulator temperature, etc.

Figure 5:
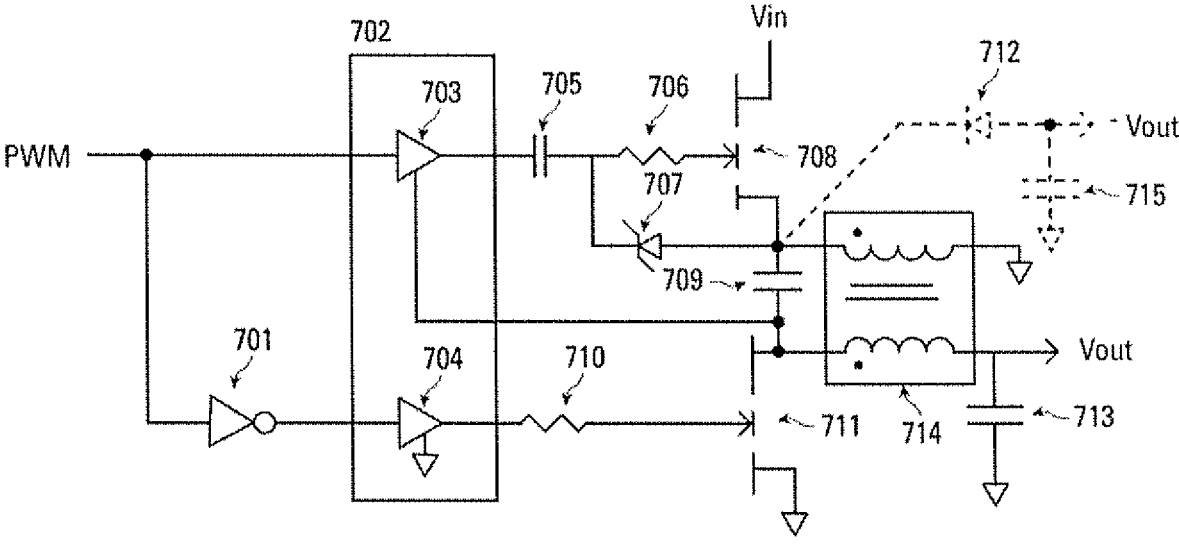
FIG. 5 is a schematic representation of an embodiment of the components of G(s) used for the output regulator.

FIG. 5 is a schematic representation of an exemplary embodiment of the components of G(s) 401 used for the output regulator. The topology illustrated is that of a synchronous Zeta converter, commonly found in the literature. However, there are several features that make this converter advantageous for use for remote systems. The PWM signal from generator 366 in FIG. 3 drives the high-side switch, 703, of gate driver, 702, and inverter, 701, drives the low-side switch, 704 of gate driver 702. Gate driver 702 may be isolated or non-isolated, but for this application a commercially available, 'half-bridge non-isolated gate driver' is used to drive the gates of Gallium Nitride (GaN) transistors, 708, and, 711. Capacitor, 705, and Zener diode, 707, are used to AC couple the high-side drive of transistor, 706, which is required when using a half-bridge gate driver 702, because the high-side gate driver 703 ground cannot generally be referenced to the gate of transistor, 708, due to gate driver 702 absolute maximum voltage requirements. Rather, in FIG. 5, the high-side driver 703 is referenced to the drain of transistor, 711. Diode, 712, and capacitor, 715, can optionally be included to provide a negative output voltage, $-V_{out}$, having approximately the same voltage magnitude, but opposite polarity, from output voltage, $V_{out}$. In most situations, inverter 701 will be realized within the PWM generator 366. Those having skill in the art of zeta converters would recognize that gate driver 702 can be implemented using other configurations. For example, gate drivers 703 and 704 can be separated, along with separate integrated circuits, for enabling the connection of high-side driver 703 directly to the source of transistor 708, while omitting capacitor 705 and Zener diode 707. Coupling capacitor 709 and transformer, 714, offer isolation of the input from the output when the power regulator is not in operation, since there is not a direct electrical connection through a switch and/or wires from input to output, thereby providing inherent reliability and safety benefits.

Figure 6:
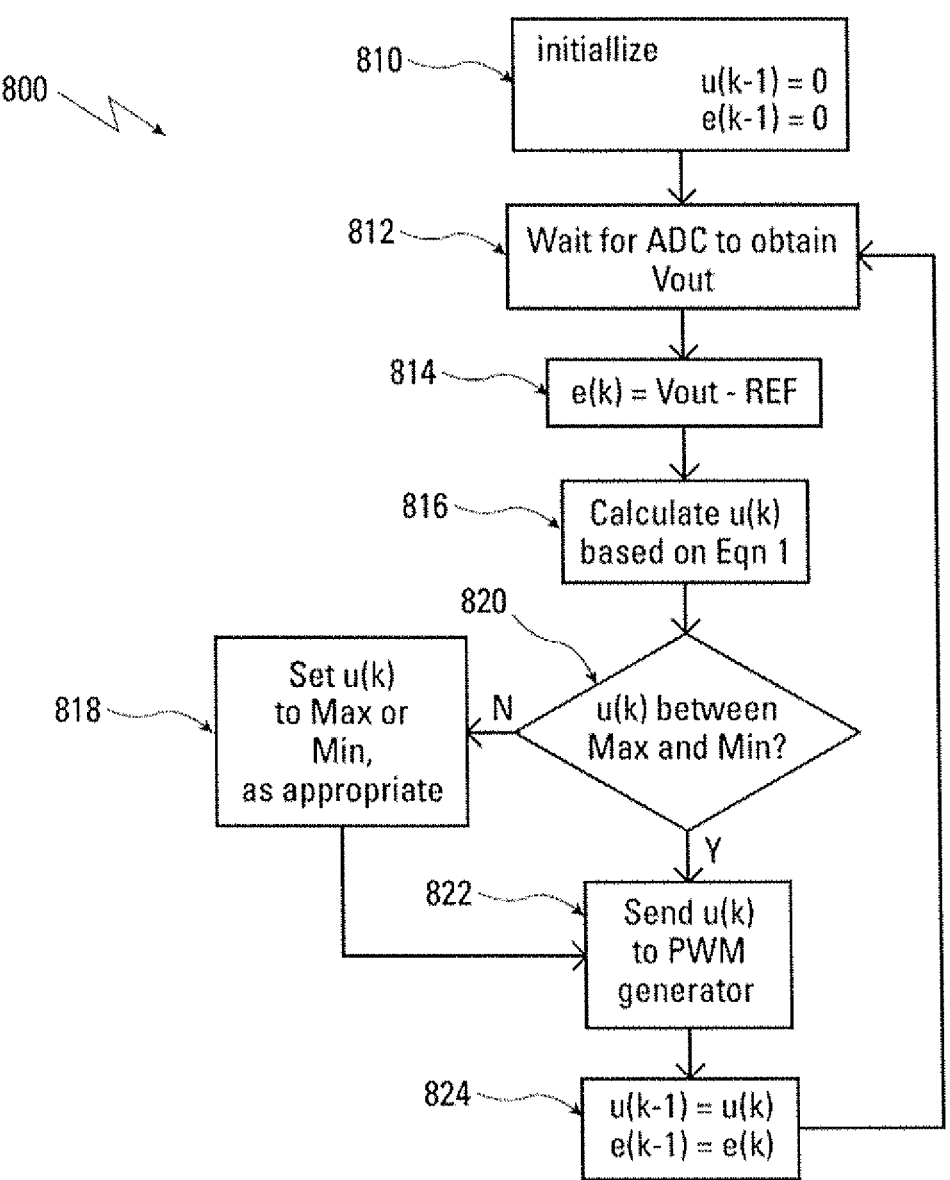
FIG. 6 illustrates an algorithm that can be used in calculations involving Equation 1 within a microcontroller.

FIG. 6 illustrates an algorithm, 800, that can be implemented within the software of the microcontroller to regulate the output voltage of the input power regulator, 200. The algorithm is used to implement the digital controller 365 (FIG. 3) of the input power regulator. Step 810, initializes the previous output, u(k−1), and previous error value(k−1) to 0 within software, as neither of u(k−1) and e(k−1) are known upon initialization. In step 812, the software awaits a measurement from ADC 358 (FIG. 3). The ADC measurement of $V_{out}$ is compared to reference 363 (FIG. 3) in step 814, to generate e(k). Equation 1 is then used to calculate u(k) in step 816. $K_a$ and $K_b$, which are stored in memory, are multiplied by e(k−1) and u(k−1), respectively. In step 820, the result of step 816, u(k), is compared to a minimum and maximum value, which are also stored in memory. In step 818, if u(k) does not fall between MAX and MIN values, then u(k) is set to the appropriate value to maintain the output signal between MAX and MIN. That is, if u(k) is calculated to be greater than MAX, then u(k) is set to MAX, and if u(k) is calculated to be less than MIN, then u(k) is set to MIN. In step 822, the value of u(k) calculated in either step 818 or step 820 is sent to the PWM generator 366 (FIG. 3), at which point, the previous entries are stored in memory, setting u(k−1)=u(k) and e(k−1)=e(k) in step 824. The process is then repeated by returning to step 812, to wait for the next ADC measurement. Although this algorithm is set forth as controlling the output voltage, it is noted that any measurement acquired by an ADC can be controlled in a similar manner, including the input voltage, input current, output voltage, output current, and the regulator temperature, etc. Variations of algorithm 800 can be used to optimize performance, and Equation 2 can also be realized through a similar algorithm. Further, the reference value, MAX, and MIN, $K_a$, and $K_b$ can all be adjusted in real-time, either through the C&DH interface or through automated methods to optimize performance.

Using methods described above, additional algorithms can be implemented within the microcontroller software to provide additional flexibility to the system, supporting rapid manufacturing an in-orbit adjustability. Two such algorithms will now be discussed, but are not exhaustive of the applicable algorithms. The described algorithms illustrate the adjustability and configurability of the present system based on spacecraft requirements. First, interleaving of power supplies is possible. Assume that ADCS 602 on a spacecraft is operated over a wide voltage range; 5V to 32V, and must be powered at all times. Assume, further that the Science 603 and RF 604 subsystems require 9V and 13V for nominal operation, respectively, and that they are not powered at the same time; that is, there are two modes of operation of the spacecraft: (a) Science Mode; and (b) Communication Mode. Because of these requirements, it is possible to power ADCS 602, Science 603, and RF system 604 using a single output power regulator 400, saving mass and volume within the system.

Figure 7:
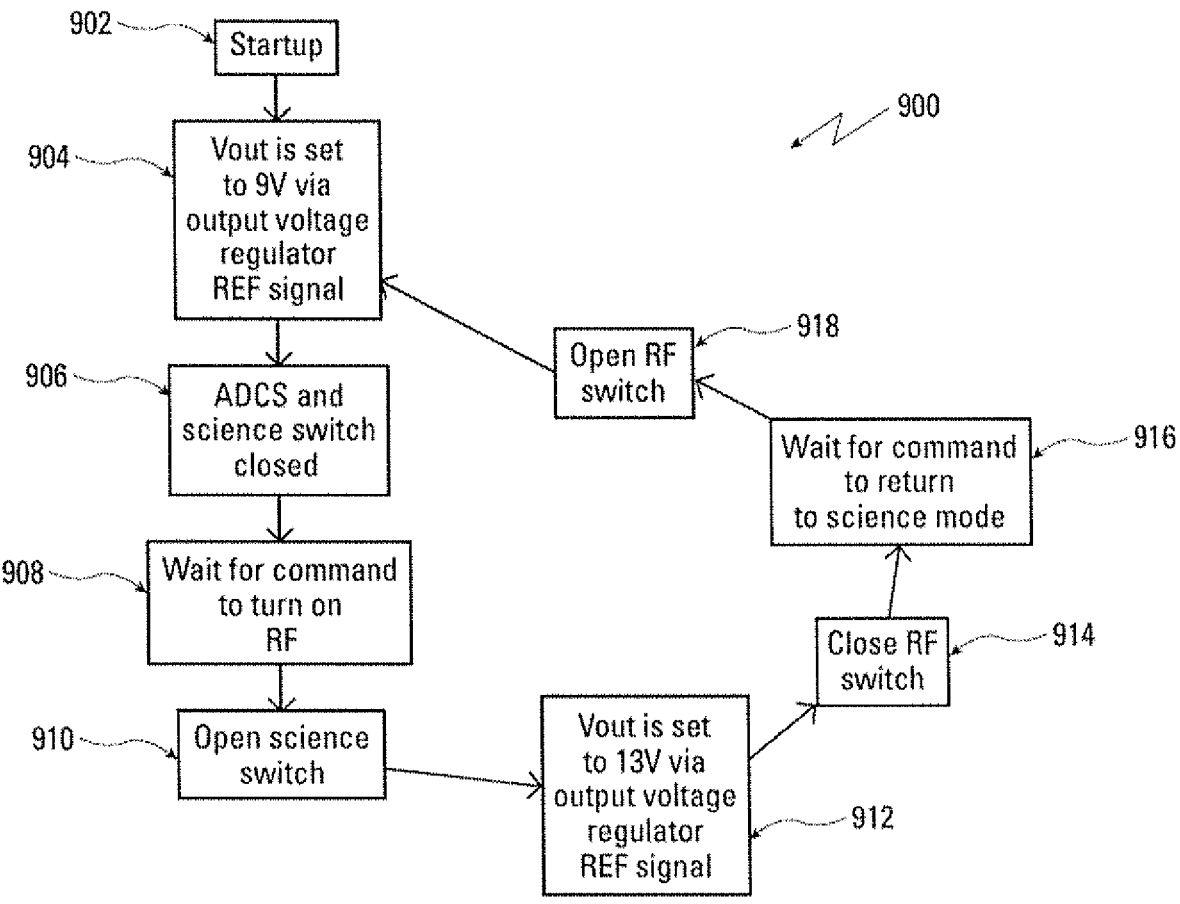
FIG. 7 illustrates an algorithm that can be loaded into the SDPC for powering the ADCS, the Science, and the RF subsystems using a single output power regulator.

FIG. 7 illustrates algorithm, 900, that can be run within microcontroller 301 software to meet this stated objective. Upon connection of SDPC 100 to battery 601, SDPC 100 is started and step 902, is performed. In step 904, the output power regulator 400 is set to output 9V by adjusting the reference signal 363 (FIG. 3), as needed. In step 906, the ADCS and Science switches 501 and 502, respectively, are closed, powering the science 603 and ADCS 602 subsystems. The spacecraft is now considered to be in Science Mode. In step 908, C&DH 605 communicates to power controller 300 to enter the communication mode. In step 910, power controller 300 opens science switch 502. In step 912, output power regulator 400 is set to output 13V by adjusting reference signal 363, as needed. In step 914, power controller 300 closes RF power switch 503, providing power to RF subsystem 604, and enabling RF communications system 606, to communicate to earth 608, via the RF antenna 609, and wireless data transmission 607. In step 916, C&DH 605 communicates to power controller 300 to return to the science mode. In step 918, power controller 300, opens RF switch 502, removing power from the RF subsystem. Returning to step 904, output power regulator 400 is set to output 9V by adjusting reference signal 363, as needed. Again, in step 906, the ADCS and science switches, 501 and 502, respectively, are closed, powering science 603 and ADCS 602 subsystems, returning to the science mode. It is noted that the second time step 906 is employed, the command to close ADCS switch 501 is redundant since the switch was closed in the first iteration of the loop, and it was not reopened. It is also noted that power controller 300 is capable of handling all of the switch state changes and adjustments of output power regulator 400 by single commands to change modes in steps 908 and 916.

Figure 8:
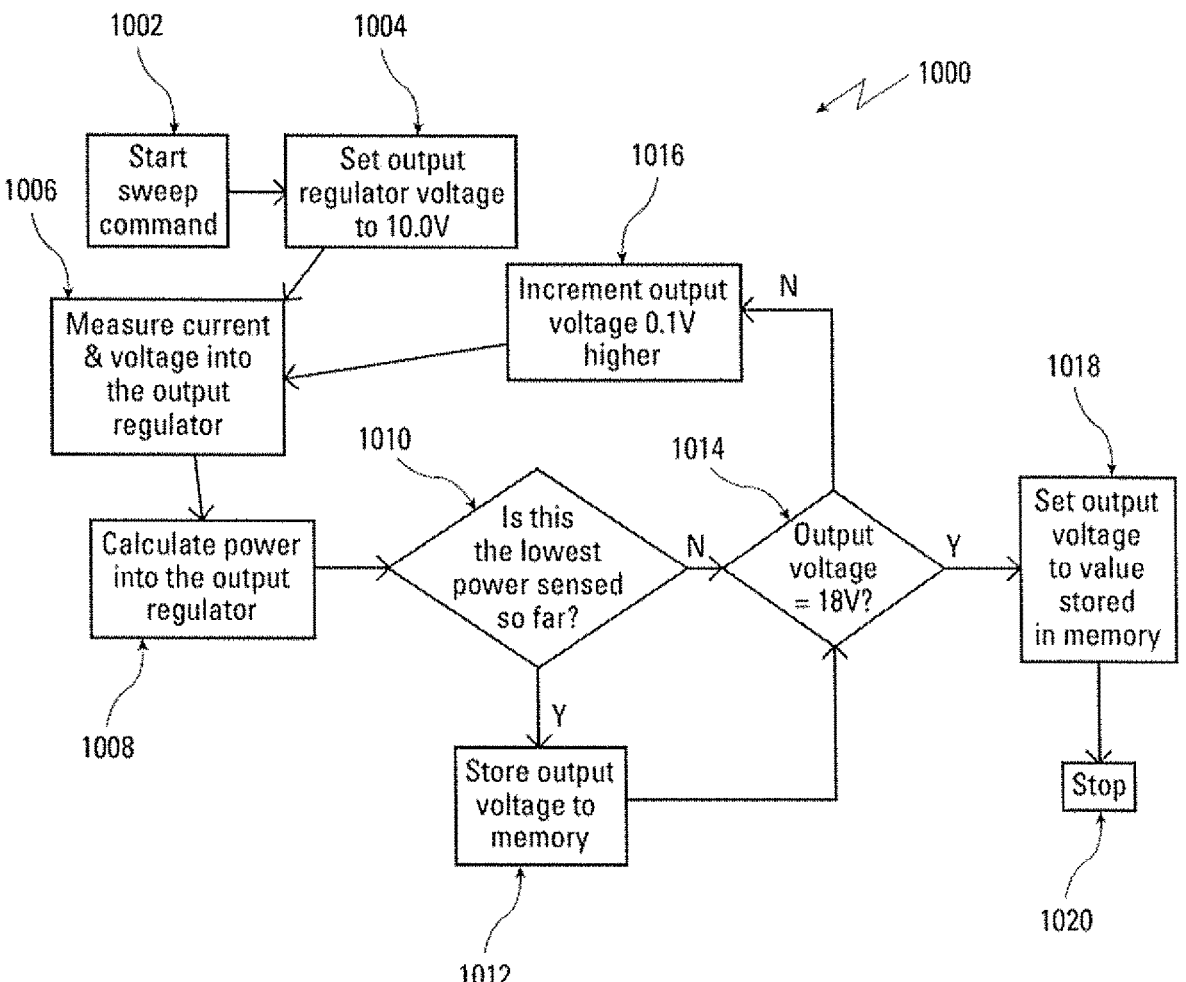
FIG. 8 shows an algorithm whereby the output power regulator output voltage is swept between 10 V and 18 V to locate a voltage for maximizing the efficiency for the SDPC.

Another algorithm, 1000, that can be implemented in the SDPC 100 is a scanning algorithm to optimize power efficiency of the spacecraft. In a different situation from that described in algorithm 900, it is assumed that ADCS 602, science 603, and RF 604 subsystems require input voltages ranging from 5V to 32V, 6V to 18V, and 10V to 22V, respectively. Therefore, the output voltage of output power regulator 400 can be swept from 10V to 18V to locate a voltage for maximizing the efficiency for SDPC 100, because 10V to 18V meets the power requirements of the three subsystems. It is advantageous to sweep the voltage in 100 mV increments. FIG. 8 illustrates such an algorithm. It is noted that the voltages and voltage increments mentioned may change; the values used herein are meant to demonstrate sweeping the voltage of the output power regulator over a range to find a nominal operating output voltage value. Of note is also that the memory within power controller 300 is used to store the starting, ending, and increment values for the voltage.

In step 1002, C&DH 605 loads the starting, ending, and increment voltages into power controller 300 memory and commands power controller 300 to begin a sweep of the output power regulator. In step 1004, power controller 300 sets output voltage regulator 400 to 10.0V by adjusting reference signal 363 (FIG. 3), as needed. In step 1006, the input voltage of output power regulator 400 is measured using ADC 361. In step 1006, the input current of output power regulator 400 is measured using an ADC. In step 1008, the measured data from step 1006 is multiplied to determine the power at the 10.0V output voltage level, this operation being performed by power controller 300. In step 1010, power controller 300 determines if the power calculated in step 1008 is the lowest power measured; if so, the loop continues to step 1012, otherwise, it continues to step 1014. As this is the first time through the loop, this is, by default, the lowest power measured, and the algorithm will continue to step 1012. In step 1012, power controller 300 stores the voltage level being applied the output of output power regulator 400 to memory. In step 1014, power controller 300 determines if the voltage has reached the terminal voltage of 18V. If it has not, the algorithm continues to step 1016, where power controller 300 increments output power regulator 400 voltage by 0.1V by adjusting reference signal 363, as needed. In this manner, the loop incrementally sets output power regulator 400 to 10.0V, 10.1V, 10.2V, . . . 18.0V, measures the input power at each voltage increment, and stores the resulting voltage value in the lowest power input. In step 1014, once all 0.1V increments have been exhausted, and the output voltage of output power regulator 400 is 18.0V, the loop exits and enters step 1018. In step 1018, the nominal output voltage stored in step 1012 is applied to output power regulator 400 by adjusting reference signal 363, as needed. At this point, the algorithm terminates in step 1020, and no further action takes place. It is noted that power controller 300 is capable of handling all adjustments of output power regulator 400 after a single command to perform the sweep in step 1002.

Having described the general details of embodiments of the present invention, the following EXAMPLE provides additional details.

EXAMPLE

Figure 9:
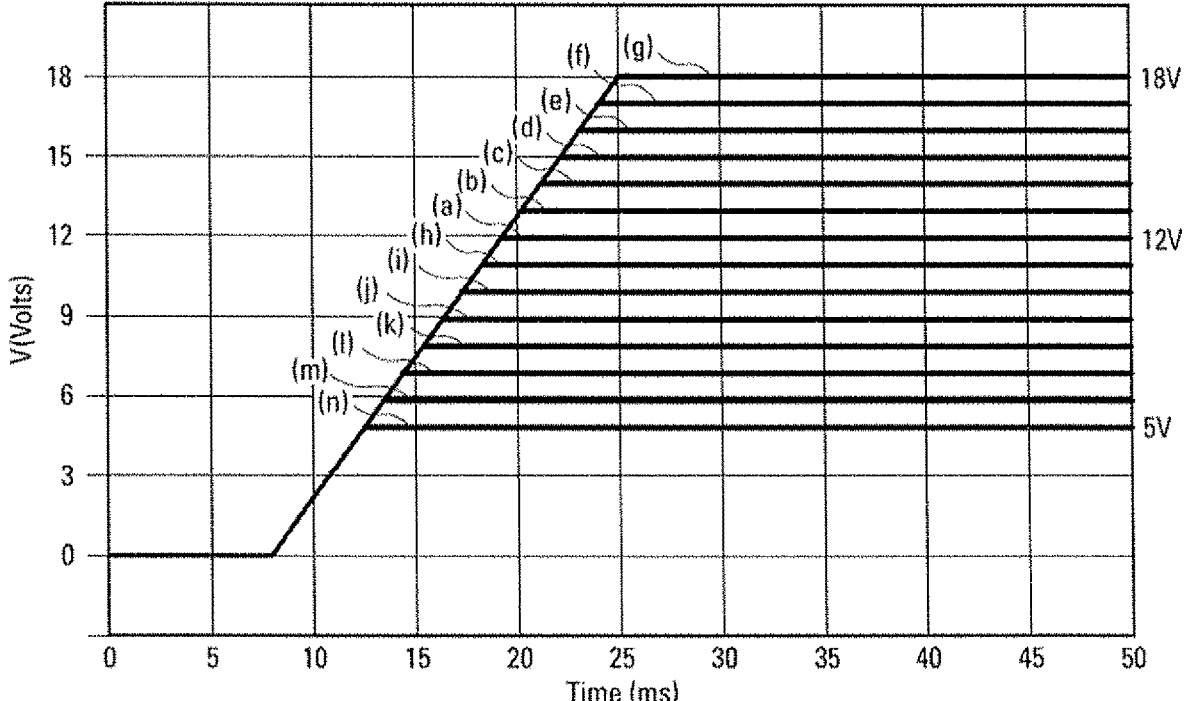
FIG. 9 is a graph illustrating the ability of the power supply to start up at a range of voltages between 5V and 18V with a constant 30 ohm load and 12V input.

A Zeta converter was designed that operates with an input voltage of 12 V, and an output voltage of between 5 V and 18 V, with a 30 ohm load. Power outputs of up to 11 W with greater than 93% efficiency and 5 kHz bandwidth have been achieved. The switching frequency was 200 kHz. FIG. 9 is a graph illustrating the ability of the power supply to start up between 5 V and at 18 V in 1 V intervals, and shows the output of the converter at each interval. Each curve, (a)-(n), was taken within seconds of one another by employing a user interface, which enables the selection of any of the 14 voltages in seconds. The open-loop bandwidth achieved was 5 kHz, with 70° of phase margin, and 12 dB of gain margin.

A Zeta converter is capable of both boosting and bucking the input voltage, and can output the same input voltage. This topology was specifically selected since it offers maximum flexibility of the output voltage. The input voltage was 12V. Trace (a) depicts the ability of the Zeta converter to output the same voltage as the output. Traces (b), (c), (d), (e), (f), and (g) depict the ability of the converter to increase the voltage from the input, referred to as 'boosting' the voltage. Traces (h), (i), (j), (k), (l), (m), and (n) depict the ability of the converter to decrease the voltage from the input, referred to as 'bucking' the voltage. This capability was enabled using the Zeta converter illustrated in FIG. 5, employing only two transistors.

The ability to adjust the gain factors $K_a$, $K_b$, and $K_c$ enables the power supply to operate at a wider operational voltage range than if an analog Zeta converter had been used. Each individual combination of gain values, optimized for a single voltage has been shown to have a useable range between two and three volts before the gain factors need to be adjusted to maintain stable operation. Having the ability to adjust the gain factors has increased the voltage range that the power supply is capable of outputting by a factor of 3 or more while maintaining the bandwidth and gain/phase margins required for remote power systems.

In summary, it is seen that the Zeta power converter output voltage can be controlled digitally, can be reconfigured in seconds, can boost and buck the input voltage, and provides stable operation over a wide operating range, allowing for rapid configuration of spacecrafts as well as in-orbit changes in configuration.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A software-defined electric power management and distribution system, comprising:
   a command and data handling computer;
   a receiver for receiving RF communications that direct software commands to said command and data handling computer;
   a DC voltage source;
   an input electric power regulator for maximum power point tracking, electrically connected with said DC voltage source, and for regulating the voltage therefrom, thereby generating a first voltage;
   an electric power controller for receiving commands from said command and data handling computer, and for controlling, using digital feedback control, said input electric power regulator; and
   an output electric power regulator for receiving the first voltage, and for receiving commands from said electric power controller, for generating a second voltage responsive to the commands from said electric power controller, using digital feedback control;
   wherein said second voltage is used for providing electrical power to a remote system;

wherein output voltages, currents, and risetimes can be adjusted using the software commands to power different loads with varying requirements.

2. The software-defined electric power management and distribution system of claim 1, further comprising a DC storage device for storing the first voltage.

3. The software-defined electric power management and distribution system of claim 2, wherein said DC storage device comprises a battery.

4. The software-defined electric power management and distribution system of claim 1, wherein said DC voltage source comprises a solar array.

5. The software-defined electric power management and distribution system of claim 1, wherein said input electric power regulator and said output electric power regulator are chosen from buck-or-boost, Cuk, Zeta, Single-Ended, Primary-Inductor Converter (SEPIC), isolated Cuk, and isolated flyback electric power converters, and combinations thereof.

6. The software-defined electric power management and distribution system of claim 5, wherein said input electric power regulator comprises a SEPIC converter, and said output electric power regulator comprises a Zeta converter.

7. The software-defined electric power management and distribution system of claim 1, wherein said electric power controller comprises a controller chosen from a digitally-adjustable lead-lag controller, a proportional, integral, derivative controller within a field-programmable gate array fabric, an analog front end for converting analog signals to digital signals, and a microcontroller, and combinations thereof.

8. The software-defined electric power management and distribution system of claim 1, further comprising an RF transmitter for receiving data from said command and data handling computer and transmitting the data.

9. The software-defined electric power management and distribution system of claim 8, wherein said output electric power regulator provides electric power to said receiver, said transmitter, said command and data handling computer, a spacecraft attitude determination and control system, and spacecraft scientific instruments having different operational voltages.

10. A method for electric power management and distribution using software, comprising:
    providing a command and data handling computer;
    receiving RF communications that direct software commands to the command and data handling computer;
    providing a DC voltage source;
    providing an electric power controller for receiving commands from the command and data handling computer;
    generating a first voltage from the DC voltage source responsive to commands from the electric power controller, thereby implementing maximum power point tracking;
    regulating the first voltage responsive to commands from the electric power controller;
    generating a second voltage from the first voltage responsive to commands from the electric power controller using digital feedback control;
    regulating the second voltage responsive to commands from the electric power controller; and
    using the second voltage for providing electrical power to a remote system;
    wherein said step of generating a first voltage and said step of regulating the first voltage are performed using an input electric power regulator, and wherein said step of generating a second voltage and said step of regulating the second voltage are performed using an output electric power regulator in which output voltages, currents, and risetimes can be adjusted using the software commands to power different loads with varying requirements.

11. The method for electric power management and distribution using software of claim 10, further comprising the step of storing the first voltage.

12. The method for electric power management and distribution using software of claim 10, wherein the DC voltage source comprises a solar array.

13. The method for electric power management and distribution using software of claim 10, wherein the input electric power regulator and the output electric power regulator are chosen from buck-or-boost, Cuk, Zeta, SEPIC, isolated Cuk, and isolated flyback electric power converters, and combinations thereof.

14. The method for electric power management and distribution using software of claim 10, wherein said input electric power regulator comprises a SEPIC converter, and said output electric power regulator comprises a Zeta converter.

15. The method for electric power management and distribution using software of claim 10, wherein the electric power controller comprises a controller chosen from a digitally-adjustable lead-lag controller, a proportional, integral, derivative controller within a field-programmable gate array fabric, an analog front end, and a microcontroller, and combinations thereof.

16. The method for electric power management and distribution using software of claim 10, further comprising the steps of receiving data from the command and data handling computer, and transmitting the data.

17. The method for electric power management and distribution using software of claim 10, further comprising the step of using the second voltage from said step of generating a second voltage for providing electrical power to a spacecraft.

18. The method for electric power management and distribution using software of claim 17, wherein said step of providing electrical power to a spacecraft comprises providing electrical power to the command and data handling computer, a spacecraft attitude determination and control system, and spacecraft scientific instruments having different operational voltages.

19. The method for electric power management and distribution using software of claim 17, wherein said steps of receiving RF commands and transmitting the data, take place between the spacecraft and earth.

20. A software-defined electric power management and distribution system, comprising:

a command and data handling computer;

a receiver for receiving RF communications that direct software commands to said command and data handling computer;

a DC voltage source;

an input electric power regulator for direct energy transfer, electrically connected with said DC voltage source, and for regulating the voltage therefrom, thereby generating a first voltage;

an electric power controller for receiving commands from said command and data handling computer, and for controlling, using digital feedback control, said input electric power regulator; and an output electric power regulator for receiving the first voltage, and for receiving commands from said electric power controller, for generating a second voltage responsive to the commands from said electric power controller using digital feedback control;

wherein said second voltage is used for providing electrical power to a remote system;

wherein output voltages, currents, and risetimes can be adjusted using the software commands to power different loads with varying requirements.

21. The software-defined electric power management and distribution system of claim 20, further comprising a DC storage device for storing the first voltage.

22. The software-defined electric power management and distribution system of claim 20, wherein said input electric power regulator comprises a sequential shunt switching regulator, or a sequential series-shunt switching regulator.

23. A method for electric power management and distribution using software, comprising:

providing a command and data handling computer;

receiving RF communications that direct software commands to the command and data handling computer;

providing a DC voltage source;

providing an electric power controller for receiving commands from the command and data handling computer;

generating a first voltage from the DC voltage source responsive to commands from the electric power controller, thereby implementing direct energy transfer;

regulating the first voltage responsive to commands from the electric power controller;

generating a second voltage from the first voltage responsive to commands from the electric power controller using digital feedback control;

regulating the second voltage responsive to commands from the electric power controller; and using the second voltage for providing electrical power to a remote system;

wherein said step of generating a first voltage and said step of regulating the first voltage are performed using an input electric power regulator, and wherein said step of generating a second voltage and said step of regulating the second voltage are performed using an output electric power regulator in which output voltages, currents, and risetimes can be adjusted using the software commands to power different loads with varying requirements.

24. The method for electric power management and distribution using software of claim 23, further comprising the step of storing the first voltage.

25. The method for electric power management and distribution using software of claim 23, wherein the input electric power regulator comprises a sequential shunt switching regulator, or a sequential series-shunt switching regulator.

26. The method for electric power management and distribution using software of claim 23, wherein the output electric power regulator is chosen from buck-or-boost, Cuk, Zeta, SEPIC, isolated Cuk, and isolated flyback electric power converters, and combinations thereof.

* * * * *